US008060007B2

(12) United States Patent
Mohr

(10) Patent No.: US 8,060,007 B2
(45) Date of Patent: Nov. 15, 2011

(54) ADAPTIVE CROSSPOLE TECHNIQUE

(75) Inventor: John A. Mohr, Camarillo, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 573 days.

(21) Appl. No.: 12/198,977

(22) Filed: Aug. 27, 2008

(65) Prior Publication Data

US 2010/0056040 A1 Mar. 4, 2010

(51) Int. Cl.

| | |
|---|---|
| ***H04K 3/00*** | (2006.01) |
| ***H04M 11/00*** | (2006.01) |
| ***H04M 1/00*** | (2006.01) |
| ***H04B 1/38*** | (2006.01) |
| ***H04B 10/00*** | (2006.01) |
| ***H04B 10/04*** | (2006.01) |
| ***H04B 10/12*** | (2006.01) |
| ***G01S 13/08*** | (2006.01) |
| ***G02F 1/01*** | (2006.01) |
| ***G02F 1/035*** | (2006.01) |
| ***G02F 1/00*** | (2006.01) |
| ***G02F 2/00*** | (2006.01) |
| ***H02H 1/00*** | (2006.01) |
| ***G02B 6/00*** | (2006.01) |
| ***H01S 3/00*** | (2006.01) |
| ***H04J 14/00*** | (2006.01) |

(52) U.S. Cl. ............ 455/1; 455/403; 455/561; 342/128; 359/279; 361/113; 385/3; 385/147; 398/1; 398/115; 398/182

(58) Field of Classification Search ................ 455/1, 73, 455/74, 77, 90.2, 90.3, 403, 422, 426, 550.1, 455/552.1, 555, 560, 561, 575.1, 612, 615; 342/13, 54, 72, 96, 128, 195, 248, 309, 322; 385/147, 3; 398/20, 21, 22, 23, 24, 39, 85, 398/116, 176, 182, 184, 195, 1, 115; 359/239, 359/276, 279; 361/113
See application file for complete search history.

(56) References Cited

U.S. PATENT DOCUMENTS

| | | | | |
|---|---|---|---|---|
| 5,838,740 | A * | 11/1998 | Kallman et al. | 375/346 |
| 6,122,083 | A * | 9/2000 | Ohta et al. | 398/1 |
| 6,324,391 | B1 * | 11/2001 | Bodell | 455/403 |
| 2003/0128417 | A1 * | 7/2003 | Kawanishi et al. | 359/279 |
| 2005/0266797 | A1 * | 12/2005 | Utsumi et al. | 455/7 |
| 2006/0104643 | A1 * | 5/2006 | Lee et al. | 398/115 |
| 2006/0239630 | A1 * | 10/2006 | Hase et al. | 385/147 |

* cited by examiner

*Primary Examiner* — Nay A Maung
*Assistant Examiner* — Paul P Tran
(74) *Attorney, Agent, or Firm* — David S. Kalmbaugh; Chris Blackburn

(57) ABSTRACT

An RF signal processing device which includes a countermeasure set connected to the processing device. The RF signal processing device shifts an incoming RF signal by ninety degrees and combines the phase shifted RF signal with RF jamming signals from a jammer. The processing device next transmits the RF signal including the RF jamming signals from the jammer.

20 Claims, 5 Drawing Sheets

ADAPTIVE CROSSPOLE TECHNIQUE

BACKGROUND OF THE INVENTION

1. Field of the Invention

The present invention relates generally to radio frequency signal processing. More specifically, the present invention relates to a method and system which prevents the loss of RF signal phase and amplitude information when the data is being processed by a countermeasure system or the like.

2. Description of the Prior Art

In the past, transmission of RF signal amplitude and phase information from a receiver antenna to an RF signal processing device always occurred by utilizing RF electrical cables to transfer the amplitude and phase information from the receiving antenna to the processing device. The RF signal is an electro-magnetic waveform received by the antenna and then converted to an equivalent RF electrical signal. Phase and amplitude information can easily change during the transfer due to cable problems and other deficiencies in an RF system. Cable leakage, temperature variations, amplifier stability and phase compilation problems are representative of the types of problems that can cause substantial variations in the transfer of RF signal amplitude and phase data using RF cables and RF electrical equipment.

Accordingly there is a need to develop an electrical RF signal transfer device which insures that phase and amplitude information are not compromised during transfer and processing of the RF signal by an RF signal device such an electronic countermeasure device.

SUMMARY OF THE INVENTION

The present invention overcomes some of the disadvantages of the past including those mentioned above in that it comprises a relatively simple, yet highly effective system and method which prevents the loss of RF signal phase and amplitude information when the data is being transferred and then processed by a countermeasure system or the like.

According to the method comprising the present invention, when an incoming RF signal is received by an antenna for processing by an electronic countermeasure system of the like, the RF signal is first converted to an equivalent optical RF signal for transmission through a first fiber optic cable. The optical RF signal is transmitted through the first fiber optic cable to a controller. The controller converts the RF optical signal to an equivalent RF digital signal.

The RF digital signal is manipulated by the controller and a countermeasure set using RF countermeasure techniques. When processing of the RF digital signal by the controller and countermeasure set is complete the signal is converted to an RF analog output signal and then transmitted to a transmit antenna via an RF electrical signal cable.

A feedback loop comprising a second fiber optic cable is included on the signal output side of the controller. The amplitude and phase for the RF analog output signal to be transmitted by the transmit antenna is monitored by the feedback loop. Phase and amplitude information for the RF analog output signal is transmitted back to the controller via the feedback loop.

The feedback loop by providing feedback of the amplitude and phase information for the transmitted signal allows the M and S controller to make adjustments to the signal to be transmitted to insure that there is a 90° phase shift between the received RF signal and the transmitted RF signal. The feedback loop allows for instantaneous re-calibration of the RF signal to be transmitted by a transmit antenna.

The controller first converts the optical signal from the second fiber optic cable to a digital equivalent signal. The controller then adjust the amplitude and phase of the RF digital output signal to compensate for amplitude and phase errors which are caused by transmission of the RF analog output signal through the RF electrical cables. The controller makes minor adjustments to the RF analog output signal to insure that phase and amplitude error are minimal operating as a self-calibrating system.

DETAILED DESCRIPTION OF A PREFERRED EMBODIMENT

Figure 1:
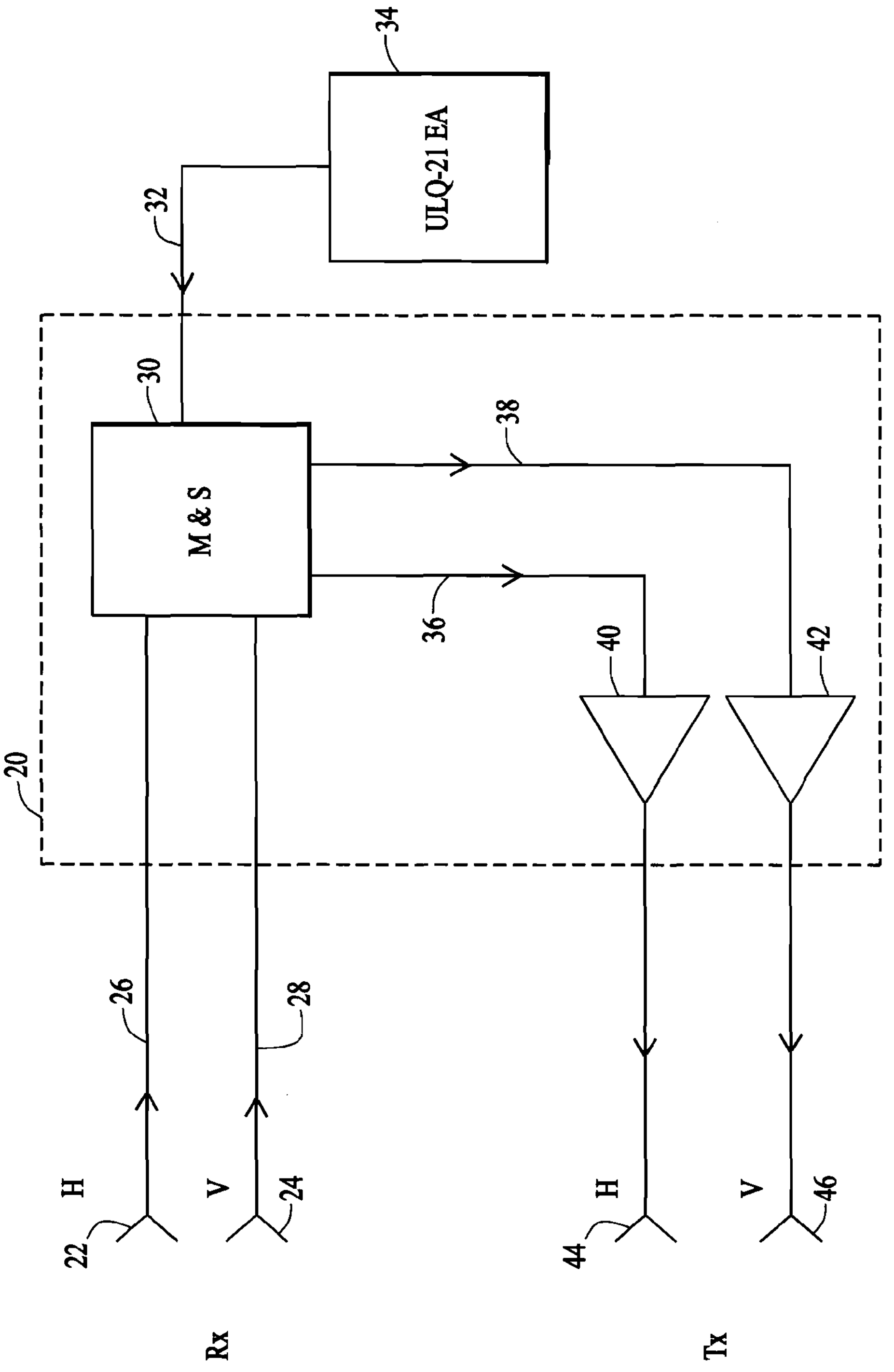
FIG. 1 illustrates an radio frequency (RF) electrical signal processing circuit which includes a countermeasure set for manipulating an incoming RF signal.

Referring first to FIG. 1, there is shown is a receiver antenna Rx which receives cross-polarized signals having two orthogonal electromagnetic waves or vertically polarized radiation and horizontally polarized radiation. Antenna receive element 22 receives the horizontally polarized radiation of the RF (radio frequency) signal. Antenna receive element 24 receives the vertically polarized radiation of the RF signal. The vertically and horizontally polarized radiation of the RF signal are then phase shifted by the Measure and Set (M and S) controller 30 which resides within RF signal processing circuit 20. The phase shift of the horizontally and vertically polarized radiation components by M and S controller 30 is 90°.

Transmission of amplitude and phase data for the horizontally polarized radiation of the RF input signal from antenna element 22 to M and S controller 30 is by a signal transmission line 26. Transmission of amplitude and phase data for the vertically polarized radiation of the RF signal from antenna element 24 to M and S controller 30 is by a signal transmission line 28.

By eliminating conventional electrically conductive RF cables for signal transmission from antenna elements 22 and 24 to M and S controller 30, the transmission problems associated with these cables are substantially reduced. For example, changes in phase and amplitude data which normally occur using conventional RF cables are almost completely eliminated when the data is converted from an RF signal to an optical format for transmission through an fiber optic cable.

Figure 2:
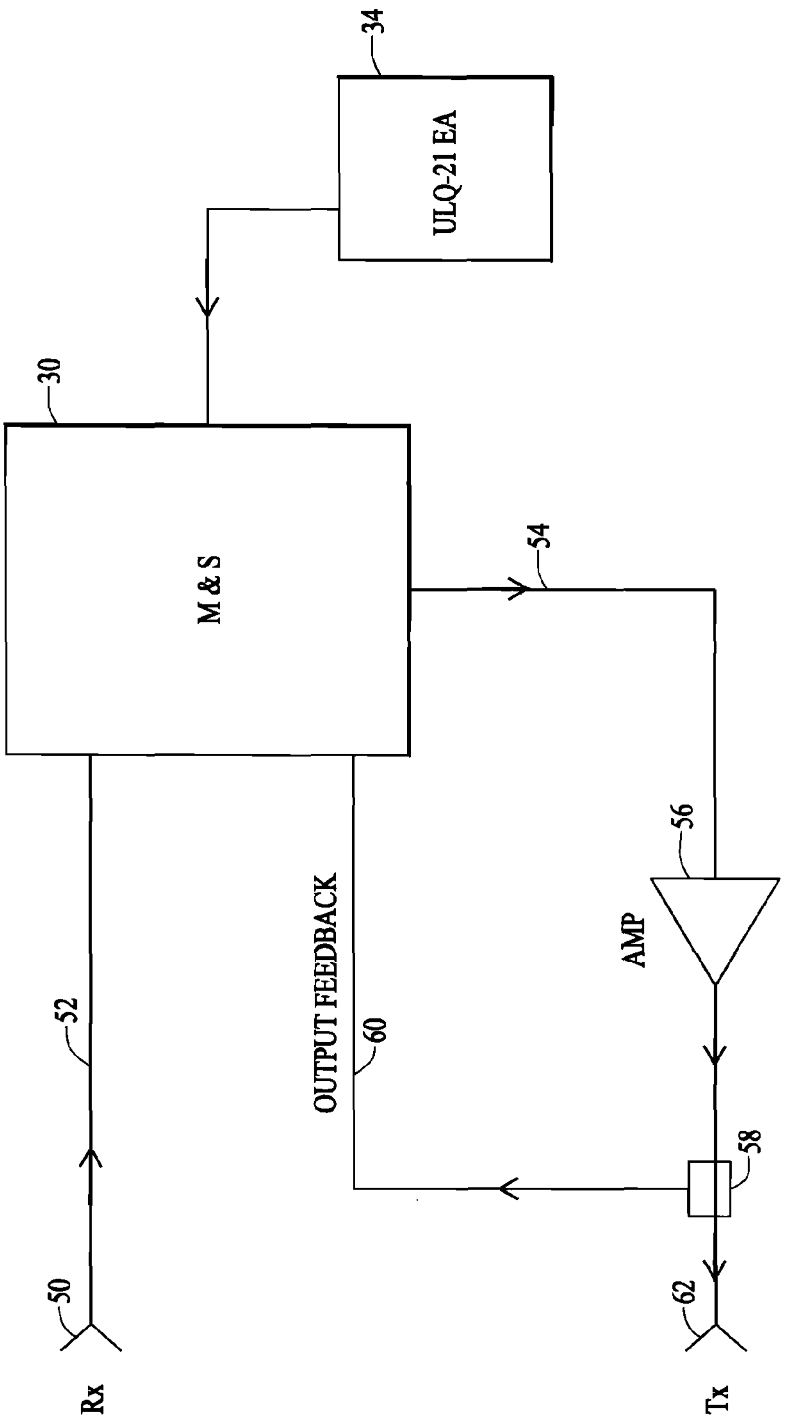
FIG. 2 illustrates the circuit of FIG. 1 which includes a feedback loop to monitor the phase and amplitude information contained in the RF analog output signal transmitted by the transmit antenna.
Figure 3:
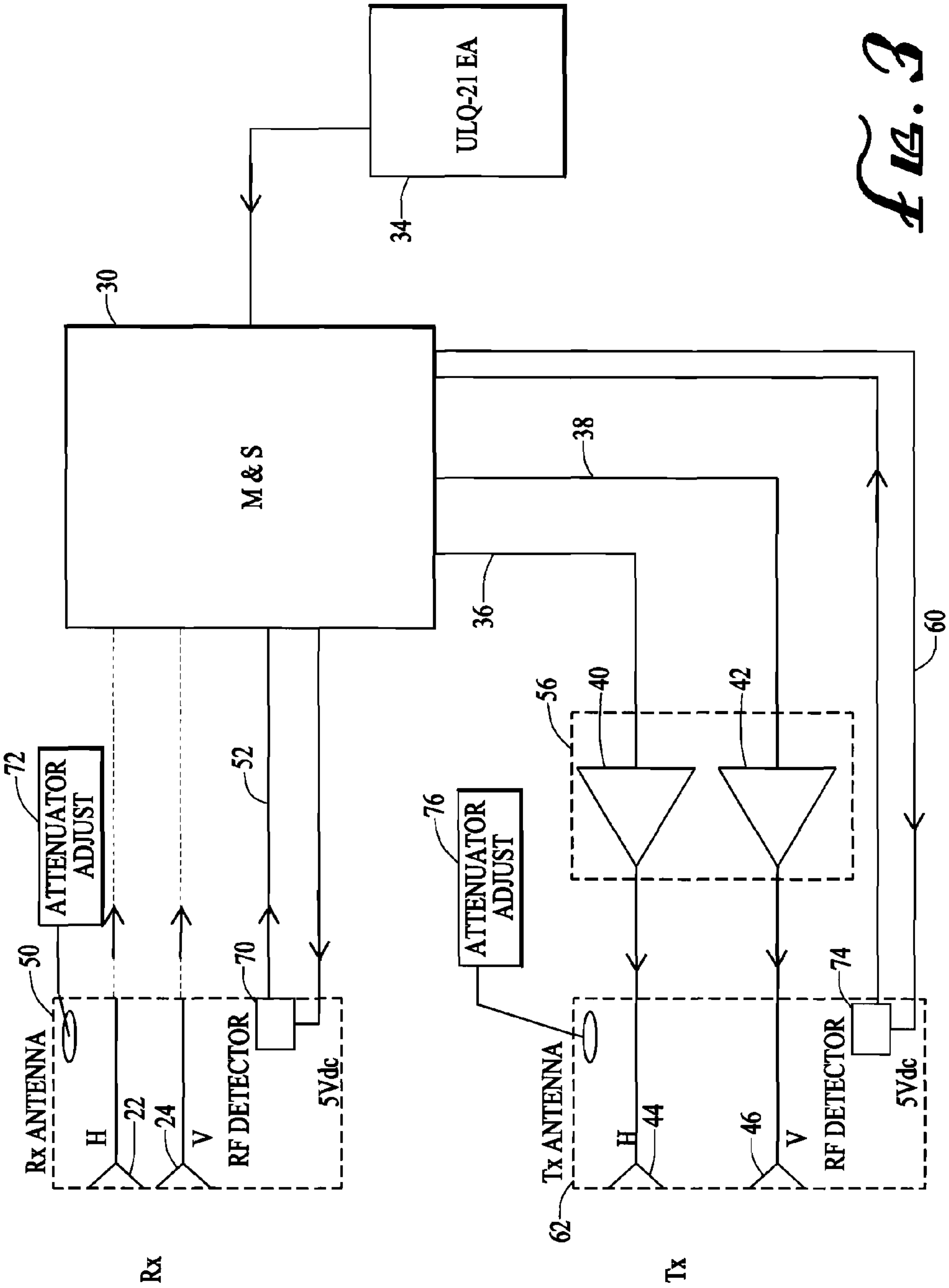
FIG. 3 is a detailed electrical schematic diagram of the RF electrical signal processing circuit of FIG. 1 which includes the feedback loop of FIG. 2.

Referring to FIGS. 2 and 3, the receiver antenna 50 includes an RF detector 70, which operates as E/O (electrical to optical) signal converter. RF detector 70 includes a high speed light emitting diode or similar device which receives a high frequency RF electrical signal in an electro-magnetic frequency range of about 850 MHz to about 18 GHz and then converts the RF electrical signal to an equivalent high frequency optical signal. By converting the high frequency electrical signal to an equivalent optical signal, the phase and amplitude information of the RF electrical signal is perfectly preserved without any degradation of the RF signal's phase and amplitude information.

A fiber optic cable 52 connects the optical signal output from detector 70 to an optical signal input of M and S controller 30. The fiber optic cable 52 prevents degradation of the RF signals amplitude and phase information while phase and amplitude data is being transferred from the antenna 50 to the M and S controller 30. Only one fiber optic cable is required since one cable can transmit multiple signals simultaneously, that is one fiber optic cable can transmit both the horizontally polarized and vertically polarized RF components of the incoming RF signal.

An adjustable attenuator 72 is also included within receive antenna 50. The attenuator 72 allows a user to adjust and reduce the power level of the incoming RF signal to match the power level of RF detector 70 preventing damage to the RF detector 70.

Connected to Measure and Set detector 30 via an electrical signal transmission line 32 is an AN/ULQ-21 (V) Electronic Countermeasure set 34, which is an electronic attack suite used in aerial and surface targets for specific mission requirements. The AN/ULQ-21(V) Electronic Countermeasure set 34 is configured to provide multiple Electronic Countermeasure (ECM) techniques including the capability to produce both noise and deception techniques across the 850 MHz to 18 GHz frequency range.

The M and S controller 34 receives one or more countermeasure signals from the AN/ULQ-21 (V) Electronic Countermeasure set 34 and then combines the phase shifted RF signal with the countermeasure signals. The processor 90 within controller 34 generates the 90° phase shaft and also combines the phase shifted RF signal with the countermeasure signals providing the RF signal to be transmitted. The countermeasure signals received from the AN/ULQ-21 (V) Electronic Countermeasure set 34 are jammer type signals.

The optical signal including the incoming RF signal's phase and amplitude information is transmitted to the M and S Controller via fiber optic cable 52. M and S controller 30 converts the optical signal to a digital equivalent signal for processing by controller 30 and Countermeasure set 34.

Referring again to FIGS. 1 and 2, a pair of electrical signal lines 36 and 38 which include a pair of power amplifiers 40 and 42 are provided on the RF output signal side of M and S controller 30. The horizontally polarized electrical component of the RF analog output signal is transmitted from controller 30 through power amplifier 40 to antenna transmit element 44 of the transmitting antenna Tx (identified by the reference numeral 62 in FIG. 2) via electrical signal line 36. The vertically polarized electrical component of the RF analog output signal is transmitted from controller 30 through amplifier 42 to antenna transmit element 46 of the transmitting power antenna 62 (FIG. 2) via electrical signal line 38. Power amplifiers 40 and 42 insure that power output for the antenna transmit elements 44 and 46 of the transmitting antenna 62 are met.

FIG. 2 illustrates the circuit 20 with a feedback loop comprising a fiber optic cable 60 which is included on the signal output side of the controller 30. The amplitude and phase for the RF analog output signal transmitted through RF electrical cable 54 to the transmit antenna 62 is monitored by the feedback loop 60. Phase and amplitude information for the RF analog output signal is transmitted back to the controller 30. The RF electrical cable 54 also includes power amplifier 56 which provides for the output power levels required for the operation of transmit antenna 62.

The feedback loop 60 by providing accurate feedback of the amplitude and phase information for the transmitted signal allows the M and S controller 30 to make adjustments to the signal to be transmitted to insure that there is a 90° phase shift between the received RF signal and the transmitted RF signal. The feedback loop 60 allows for instantaneous recalibration of the RF signal by controller 30, which is to be transmitted by transmit antenna 62. The use a fiber optic cable insures the accuracy of the phase and amplitude information provided to processor 90 by allowing for data feedback using optical signals which will not degrade during transmission.

At this time it should be noted that the 90° phase shift between the received RF signal and the transmitted RF signal is a jamming technique. The phase shift provides a null which makes the return signal appear void of any objects.

The feedback loop 60 also compensates for non-linearity in the power amplifier 60 which can cause the transmitted signal to become out of calibration.

As shown in FIG. 3, the feedback loop includes an RF detector 74 which monitors the amplitude and phase information for the RF analog output signal to be transmitted by the transmit antenna 62. Phase and amplitude information for the RF analog output signal is transmitted by the RF detector 74 back to the controller 30. RF detector 74 includes a high speed light emitting diode or similar device which receives a high frequency RF electrical signal in an electro-magnetic frequency range of about 850 MHz to about 18 GHz and then converts the RF electrical signal to an equivalent high frequency optical signal. By converting the high frequency electrical signal to an equivalent optical signal, the phase and amplitude information of the RF electrical signal is perfectly preserved without any degradation of the RF signal's phase and amplitude information.

The controller 30 first converts the optical signal from the fiber optic cable 60 to a digital equivalent signal. The controller 30 then adjust the amplitude and phase of the RF digital equivalent signal to compensate for amplitude and phase errors which are caused by transmission of the RF analog output signal through the RF electrical cables. The controller 30 makes minor adjustments to the RF analog output signal to insure that phase and amplitude error are minimal operating as a self-calibrating system. The transmit antenna 62 also has an adjustable attenuator 76. The attenuator 76 allows a user to adjust and reduce the power level of the RF electrical output signal to match the power level for RF detector 74 preventing damage to the RF detector 74.

Figure 4:
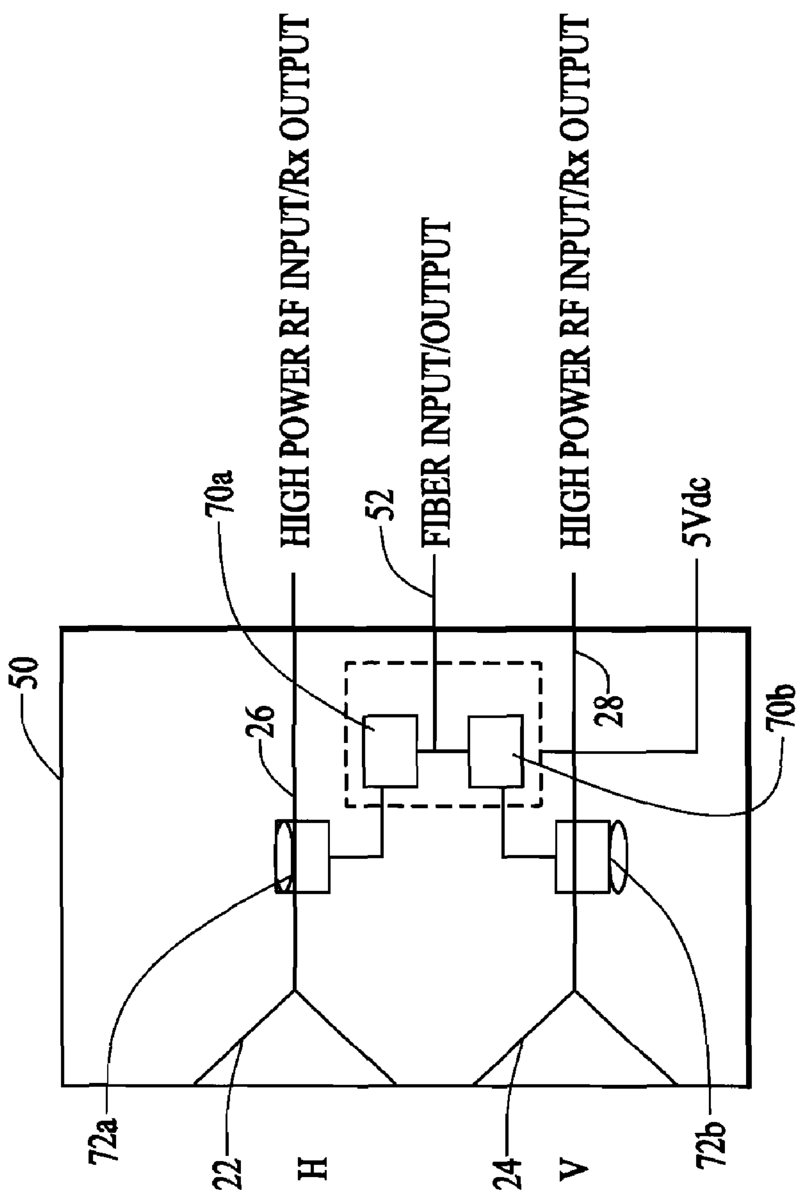
FIG. 4 is a detailed electrical signal processing diagram of the receive antenna of FIGS. 1, 2 and 3.

Referring to FIGS. 3 and 4, there is shown a detailed circuit diagram for the receive antenna 50. The circuit diagram for the transmit antenna 62 is virtually identical to the receive antenna 50. The receive antenna 50 includes two identical adjustable attenuators 72*a* and 72*b* which reduce power levels for the horizontal and vertical polarized components of the incoming RF electrical signal to levels which are compatible power input requirements of RF detectors 70*a* and 70*b*. The horizontally polarized component of the incoming RF electrical signal is supplied by attenuator 72*a* to RF detector 70*a* and the vertically polarized component of the incoming RF electrical signal is supplied by attenuator 72*b* to RF detector 70*b*. The components are converted to optical equivalents and transmitted to M and S controller 30 via fiber optic cable 52. A 5 VDC power supply is also connected to RF detectors 70A and 70B.

Figure 5:
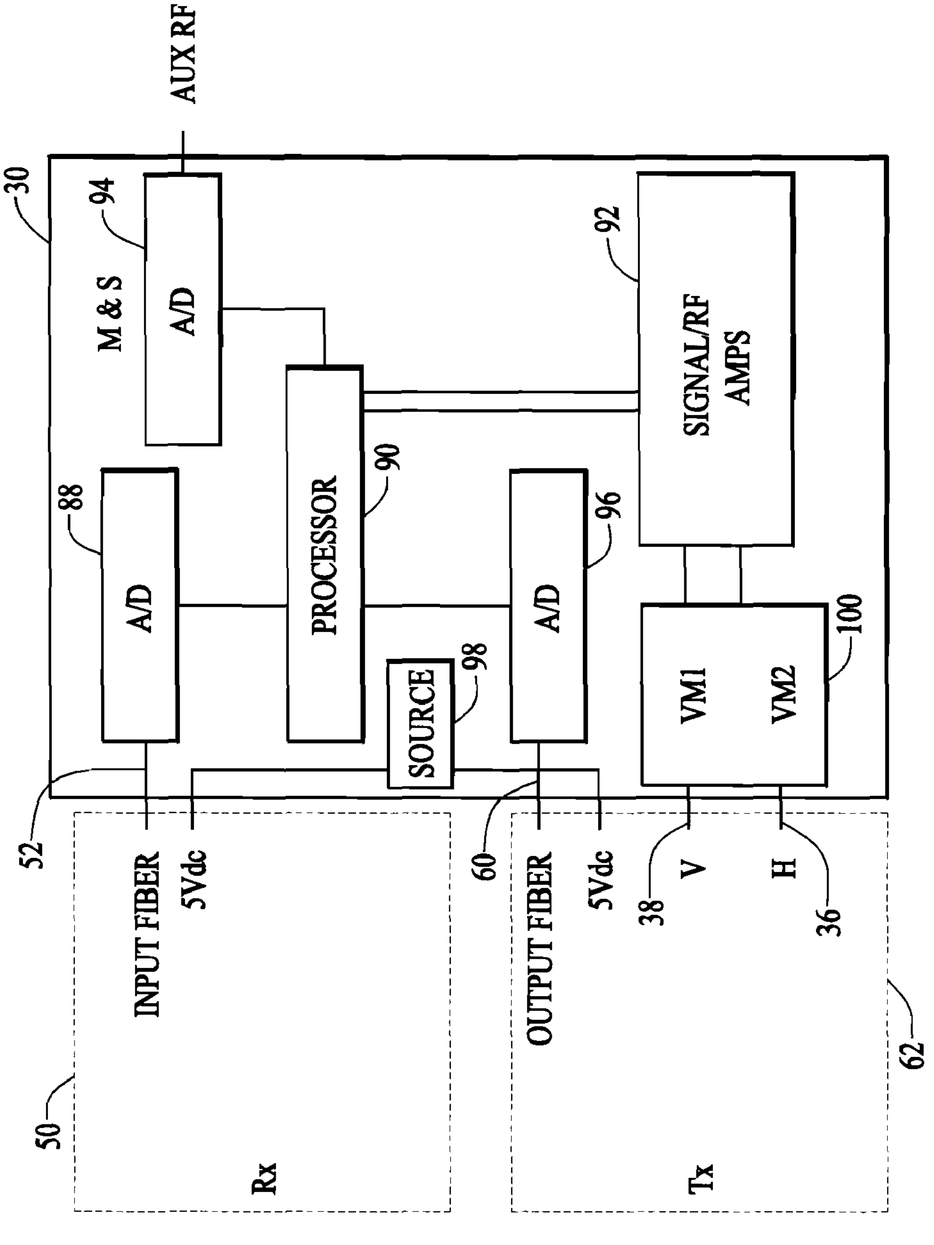
FIG. 5 is a detailed electrical signal diagram of the M and S controller of FIGS. 1, 2 and 3.

Referring to FIG. 5 there is shown a detailed electrical schematic diagram for the M and S controller 30. The controller 30 includes a power source 98 which receives an external 5 VDC and converts the 5 VDC to the voltage levels required to operate the internal components of the controller 30. An A/D converter 96 converts the output of feedback cable 60 to an equivalent digital signal which is then supplied to processor 90. Processor 90 adjust the phase and amplitude of the RF analog output signal to compensate for amplitude and phase errors which are caused by transmission of the RF analog output signal through the RF electrical cables 36 and 38. The processor 90 makes minor adjustments to the RF analog output signal to insure that phase and amplitude error are minimal operating as a self-calibrating system. The amplitude and phase adjustment are made in response to the digital signal from A/D converter 96 to correct for cable leakage, temperature variations, amplifier stability, phase compilation problems and other problems associated with electrical cables 36 and 38 and amplifiers 40 and 42. The processor 90 is a high speed processor which provides adequate time for the processor to make the calculations required to maintain the 90° phase shift and combine the phase shifted signal with the countermeasure signals from AN/ULQ-21 (V) Electronic Countermeasure set 34.

When the processor 90 completes the corrections to the amplitude and phase data for the signal to be transmitted by transmit antenna 62, a digital equivalent RF signal is supplied to a signal/RF amplifier 92 which converts the signal to an analog RF format and amplifies the RF signal. The signal is then supplied to a VM1/VM2 vector modulator circuit 100. The VM1/VM2 circuit 100 allows for any correction of errors introduced by the amplifiers 40 and 42. VM1/VM2 circuit 100 is controlled by the processor 90.

From the foregoing, it is readily apparent that the present invention comprises a new, unique and exceedingly useful method and system for phase and amplitude error occurring in an RF transmitted signal, which constitutes a considerable improvement over the known prior art. Obviously, many modifications and variations of the present invention are possible in light of the above teachings. It is therefore to be understood that within the scope of the appended claims that the invention may be practiced otherwise than as specifically described.

What is claimed is:

1. A radio frequency (RF) signal processing device comprising:

(a) a receiver antenna for receiving a radio frequency signal having vertically polarized radiation and horizontally polarized radiation;

(b) a first radio frequency detector included within said receiver antenna for receiving said radio frequency signal from said receiver antenna and then converting said radio frequency signal to an equivalent first high frequency optical signal;

(c) a first fiber optic cable having one end connected to said first radio frequency detector;

(d) a controller connected to an opposite end of said first fiber optic cable wherein said first fiber optic cable transmits said first high frequency optical signal from said first radio frequency detector to said controller for processing by said controller;

(e) said controller phase shifting said first high frequency optical signal by ninety degrees, and then providing a high frequency electrical signal which includes a ninety degree phase shift;

(f) an RF electrical cable having one end connected to said controller;

(g) a transmitter antenna connected to an opposite end of said RF electrical cable wherein said RF electrical cable transmits said high frequency electrical signal including said ninety degree phase shift from said controller to said transmitter antenna;

(h) a second radio frequency detector included within said transmitter antenna for monitoring said high frequency electrical signal from said controller and then converting said high frequency electrical signal to a second high frequency optical signal which includes amplitude and phase information for said high frequency electrical signal;

(i) a second fiber optic cable having one end connected to said second radio frequency detector and an opposite end connected to said controller wherein said second fiber optic cable transmits said second high frequency optical signal including said amplitude and phase information from said second radio frequency detector to said controller; and (j) said controller responsive to said second high frequency optical signal, making adjustments to said high frequency electrical signal to insure that there is said ninety degree phase shift between said radio frequency signal received by said receiver antenna and an equivalent radio frequency signal to be transmitted by said transmitter antenna.

2. The RF signal processing device of claim 1 further comprising a power amplifier within said RF electrical cable, said power amplifier providing for output power levels required for the operation of said transmitter antenna.

3. The RF signal processing device of claim 1 wherein second fiber optic cable operates as a feedback loop allowing for instantaneous re-calibration of said equivalent radio frequency signal to be transmitted by said transmitter antenna.

4. The RF signal processing device of claim 1 wherein said receiver antenna includes an adjustable attenuator, said adjustable attenuator allowing a user to adjust and reduce a power level for said radio frequency signal received by said receiver antenna to match a power level for said first radio frequency detector preventing damage to said first radio frequency detector.

5. The RF signal processing device of claim 1 wherein said transmitter antenna includes an adjustable attenuator, said adjustable attenuator allowing a user to adjust and reduce a power level for said equivalent radio frequency signal to be transmitted by said transmitter antenna to match a power level for said second radio frequency detector preventing damage to said second radio frequency detector.

6. The RF signal processing device of claim 1 wherein said controller comprises:

(a) an analog to digital converter having an analog input connected to said first fiber optic cable;

(b) a processor connected to a digital output of said analog to digital converter;

(c) a digital to analog converter having a digital input connected to said processor and an analog output connected to said second fiber optic cable;

(d) a signal/RF amplifier having a pair of digital inputs connected to said processor and a pair of analog outputs; and (e) a vector modulator circuit having a pair of analog inputs connected to the pair of analog outputs for said signal/RF amplifier, said vector modulator having a pair of analog outputs connected to said transmitter antenna.

7. The RF signal processing device of claim 6 wherein said processor within said controller generates said high frequency electrical signal which includes said ninety degree phase shift.

8. A radio frequency (RF) signal processing device comprising:

(a) a receiver antenna for receiving a radio frequency signal having vertically polarized radiation and horizontally polarized radiation;

(b) a first radio frequency detector included within said receiver antenna for receiving said radio frequency signal from said receiver antenna and then converting said radio frequency signal to an equivalent first high frequency optical signal;

(c) a first fiber optic cable having one end connected to said first radio frequency detector;

(d) a controller connected to an opposite of said first fiber optic cable wherein said first fiber optic cable transmits said first high frequency optical signal from said first radio frequency detector to said controller for processing by said controller;

(e) said controller phase shifting said first high frequency optical signal by ninety degrees, and then providing a high frequency electrical signal which includes a ninety degree phase shift;

(f) an electronic countermeasure set connected to said controller for generating countermeasure signals wherein said controller receives said countermeasure signals from said electronic countermeasure set and then combines said high frequency electrical signal including said ninety degree phase shift with said countermeasure signals;

(g) an RF electrical cable having one end connected to said controller;

(h) a transmitter antenna connected to an opposite end of said RF electrical cable wherein said RF electrical cable transmits said high frequency electrical signal including said ninety degree phase shift and said countermeasure signals from said controller to said transmitter antenna;

(i) a second radio frequency detector included within said transmitter antenna for monitoring said high frequency electrical signal from said controller and then converting said high frequency electrical signal to a second high frequency optical signal which includes amplitude and phase information for said high frequency electrical signal;

(j) a second fiber optic cable having one end connected to said second radio frequency detector and an opposite end connected to said controller wherein said second fiber optic cable transmits said second high frequency optical signal including said amplitude and phase information from said second radio frequency detector to said controller; and (k) said controller responsive to said second high frequency optical signal, making adjustments to said high frequency electrical signal to insure that there is said ninety degree phase shift between said radio frequency signal received by said receiver antenna and a radio frequency signal to be transmitted by said transmitter antenna, wherein said radio frequency signal to be transmitted by said transmitter antenna includes said countermeasure signals.

9. The RF signal processing device of claim 8 further comprising a power amplifier within said RF electrical cable, said power amplifier providing for output power levels required for the operation of said transmitter antenna.

10. The RF signal processing device of claim 8 wherein second fiber optic cable operates as a feedback loop allowing for instantaneous re-calibration of said radio frequency signal to be transmitted by said transmitter antenna.

11. The RF signal processing device of claim 8 wherein said receiver antenna includes an adjustable attenuator, said adjustable attenuator allowing a user to adjust and reduce a power level for said radio frequency signal received by said receiver antenna to match a power level for said first radio frequency detector preventing damage to said first radio frequency detector.

12. The RF signal processing device of claim 8 wherein said transmitter antenna includes an adjustable attenuator, said adjustable attenuator allowing a user to adjust and reduce a power level for said radio frequency signal to be transmitted by said transmitter antenna to match a power level for said second radio frequency detector preventing damage to said second radio frequency detector.

13. The RF signal processing device of claim 8 wherein said controller comprises:

(a) a first analog to digital converter having an analog input connected to said first fiber optic cable;

(b) a processor connected to a digital output of said analog to digital converter;

(c) a digital to analog converter having a digital input connected to said processor and an analog output connected to said second fiber optic cable;

(d) a signal/RF amplifier having a pair of digital inputs connected to said processor and a pair of analog outputs;

(e) a vector modulator circuit having a pair of analog inputs connected to the pair of analog outputs for said signal/RF amplifier, said vector modulator having a pair of analog outputs connected to said transmitter antenna; and (f) a second analog to digital converter having an analog input connected to said electronic countermeasure set and a digital output connected to said processor.

14. The RF signal processing device of claim 8 wherein said processor within said controller generates said high frequency electrical signal which includes said ninety degree phase shift and said countermeasure signals received from said electronic countermeasure set.

15. A method for radio frequency (RF) signal processing device comprising the steps of:

(a) receiving a radio frequency signal having vertically polarized radiation and horizontally polarized radiation, wherein said radio frequency antenna is within an electro-magnetic frequency range of 850 MHz to 18 GHz, and a receiver antenna receives said radio frequency signal;

(b) converting said radio frequency signal to an equivalent first high frequency optical signal, wherein a first radio frequency detector converts said radio frequency signal to said equivalent first high frequency optical signal;

(c) providing a first fiber optic cable having one end connected to said first radio frequency detector;

(d) providing a controller connected to an opposite end of said first fiber optic cable;

(e) transmitting said first high frequency optical signal from said first radio frequency detector to said controller through said first fiber optic cable for processing by said controller;

(f) shifting a phase of said first high frequency optical signal by ninety degrees;

(g) generating a high frequency electrical signal which includes a ninety degree phase shift, wherein said controller shifts the phase of said first high frequency optical signal and generates said high frequency electrical signal which includes said ninety degree phase shift;

(h) providing an RF electrical cable having one end connected to said controller;

(i) providing a transmitter antenna connected to an opposite end of said RF electrical cable;

(j) transmitting said high frequency electrical signal including said ninety degree phase shift from said controller to said transmitter antenna, wherein said RF electrical cable transmits said high frequency electrical signal including said ninety degree phase shift from said controller to said transmitter antenna;

(k) converting said high frequency electrical signal to a second high frequency optical signal which includes amplitude and phase information for said high frequency electrical signal, wherein a second radio frequency detector converts said high frequency electrical signal to said second high frequency optical signal;

(l) providing a second fiber optic cable having one end connected to said second radio frequency detector and an opposite end connected to said controller;

(m) transmitting said second high frequency optical signal including said amplitude and phase information from said second radio frequency detector to said controller, wherein said second fiber optic cable transmits said second high frequency optical signal including said amplitude and phase information from said second radio frequency detector to said controller; and (n) adjusting said high frequency electrical signal to insure that there is said ninety degree phase shift between said radio frequency signal received by said receiver antenna and an equivalent radio frequency signal to be transmitted by said transmitter antenna, wherein said controller responsive to said second high frequency optical signal, adjust said high frequency electrical signal to insure that there is said ninety degree phase shift between said radio frequency signal received by said receiver antenna and said equivalent radio frequency signal to be transmitted by said transmitter antenna.

16. The method of claim 15 further comprising the steps of:

(a) generating countermeasure signals wherein an electronic countermeasure set generates said countermeasure signals;

(b) providing said countermeasure signals to said controller; and (c) combining said high frequency electrical signal including said ninety degree phase shift with said countermeasure signals, wherein said controller combines said high frequency electrical signal with said countermeasure signals.

17. The method of claim 15 further comprising the step of providing an adjustable attenuator within said receiver antenna wherein said adjustable attenuator allows a user to adjust and reduce a power level for said radio frequency signal received by said receiver antenna to match a power level for said first radio frequency detector preventing damage to said first radio frequency detector.

18. The method of claim 15 further comprising the step of providing an adjustable attenuator within said transmitter antenna wherein said adjustable attenuator allows a user to adjust and reduce a power level for said equivalent radio frequency signal to be transmitted by said transmitter antenna to match a power level for said second radio frequency detector preventing damage to said second radio frequency detector.

19. The method of claim 15 further comprising the step of providing a power amplifier within said RF electrical cable, wherein said power amplifier provides for output power levels required for the operation of said transmitter antenna.

20. The method of claim 15 further comprising the step of provding a feedback loop between said controller and said transmitter antenna which allows for instantaneous re-calibration of said equivalent radio frequency signal to be transmitted by said transmitter antenna, wherein said feedback loop comprises said second fiber optic cable.

* * * * *